United States Patent [19]
Witte

[11] 4,449,783
[45] May 22, 1984

[54] OPTICAL STAR COUPLER WITH A PLANAR MIXER ELEMENT

[75] Inventor: Hans H. Witte, Munich, Fed. Rep. of Germany

[73] Assignee: Siemens Aktiengesellschaft, Berlin & Munich, Fed. Rep. of Germany

[21] Appl. No.: 240,870

[22] Filed: Mar. 5, 1981

[30] Foreign Application Priority Data

Mar. 21, 1980 [DE] Fed. Rep. of Germany ....... 3011059

[51] Int. Cl.³ .............................................. G02B 5/172
[52] U.S. Cl. ................................. 350/96.16; 156/154
[58] Field of Search .............. 350/96.15, 96.16, 96.18, 350/96.19, 96.17; 156/153, 154

[56] References Cited

U.S. PATENT DOCUMENTS

| | | | |
|---|---|---|---|
| 4,184,740 | 1/1980 | d'Auria et al. | 350/96.16 |
| 4,193,661 | 3/1980 | d'Auria et al. | 350/96.16 |
| 4,199,222 | 4/1980 | Ikushima et al. | 350/96.19 |
| 4,200,356 | 4/1980 | Hawkes et al. | 350/96.16 |
| 4,213,670 | 7/1980 | Milton et al. | 350/96.16 |
| 4,285,570 | 8/1981 | Minemura et al. | 350/96.18 |
| 4,362,357 | 12/1982 | Stockmann et al. | 350/96.16 |

FOREIGN PATENT DOCUMENTS

| | | | |
|---|---|---|---|
| 2000877 | 1/1979 | United Kingdom | 350/96.17 |
| 2005045 | 4/1979 | United Kingdom | |

OTHER PUBLICATIONS

F. Auracher et al., "Optimized Layout for Data Bus System Based on a New Planar Access Coupler," *Applied Optics*, vol. 16, No. 12, Dec. 1977, pp. 3140–3142.

G. L. Tangonan et al., "Planar Multimode Couplers for Fiber Optics," *Optics Communications*, vol. 27, No. 3, Dec. 1978, pp. 358–360.

Hudson et al., "The Star Coupler: A Unique Interconnection Component for Multi-Mode Optical Waveguide Communication Systems," *Applied Optics*, vol. 13, No. 11, Nov. 1974, pp. 2540–2545.

*Schott Informationen*, No. 4, 1978, pp. 21–22, (with translation).

M. Stockmann et al., "Planar Star Coupler for Multimode Fibers," *Applied Optics*, vol. 19, No. 15, Aug. 1980, pp. 2584–2588.

A. F. Milton, "Star and Access Couplers for Multichannel Fiber Cables," *IEEE J. Quantum Electron*, vol. QE13, No. 9 (9/77), p. 21D.

*Primary Examiner*—John D. Lee
*Attorney, Agent, or Firm*—Hill, Van Santen, Steadman & Simpson

[57] ABSTRACT

An optical star coupler, which includes a mixing element consisting of a planar waveguide having an input and output end for interconnecting two groups of light conducting fibers with a packing density of each group of fibers being as high as possible and the planar waveguide having a thickness approximately equal to the diameter of the fibers, characterized by each fiber which is to be connected to a fiber of a fiber optical system having a diameter approximately equal to the core diameter of this fiber of the fiber optical system and, preferably, the mixing element on the surfaces, which are not connected to the fibers, are in contact with a medium having an index of refraction less than the index of refraction of the mixing element. Preferably, this medium comprises a material having substantially the same coefficient of thermal expansion and is an optical adhesive.

13 Claims, 10 Drawing Figures

OPTICAL STAR COUPLER WITH A PLANAR MIXER ELEMENT

BACKGROUND OF THE INVENTION

The present invention is directed to an optical star coupler for multi-mode fiber optical waveguides in which two bundles of optical fibers are connected to one another by a mixing element consisting of a planar waveguide having a thickness which is approximately equal to the diameter of the fibers and the incoming and outgoing group of fibers lie in the same plane as the planar waveguide so that the packing density is as high as possible.

It has been proposed in U.S. patent application Ser. No. 136,423, filed Apr. 2, 1980, which issued as U.S. Pat. No. 4,362,357 on Dec. 7, 1982 and was based on German Pat. No. 29 15 114.2, to provide an optical star coupler for multimode light conducting fibers which coupler has a mixing element formed by a planar waveguide having a thickness approximately equal to the diameters of the fibers which are connected to the input and output ends of the mixing element and the fibers of the incoming group and outgoing group as well as the mixing element are all positioned substantially in the same plane.

In comparison to three dimensional embodiments of the coupler, the optical star coupler of the above-mentioned application exhibits low insertion losses. Therefore they are particularly suited for use in optical communication technology particularly in data buses in which high path attenuation occurs because of the large distances between the subscribers and/or the large number of subscribers involved in the information exchange. The planar waveguide, as a mixing element, guarantees a good mixing of all modes and thus provides as uniform as possible a light distribution to all fixed output fibers in comparison to all input fibers. Each of the input and the output fibers of the optical star coupler are connected to a system fiber for example in a data bus.

The thickness of the planar waveguide was made equal to the diameter of the fiber optical waveguides of the input and the output groups so that the coupling losses on transition from the fiber optical waveguides to the mixing element and vice versa are as low as possible. Moreover, the jacket thickness of the fiber optical waveguides are kept as thin as possible.

SUMMARY OF THE INVENTION

The present invention is directed to further reducing the coupling losses created at a star coupler of a type utilizing a planar waveguide as a mixing element and to providing improved methods of manufacturing the specific mixing element.

These objects are achieved as an improvement in an optical star coupler for multi-mode light conducting fibers, said coupler including a mixing element consisting of a planar waveguide having an input end and an output end for interconnecting two groups of light conducting fibers with a packing density of each groups of fibers at the input and output ends being as high as possible, said planar waveguide having a thickness being approximately equal to the diameter of the fibers being coupled to the input and output ends and the fibers being in the same plane with the mixing element. The improvement comprises each fiber, which is to be connected to a fiber of a fiber optical system, having a diameter approximately equal to the core diameter of this fiber of the fiber optical system. Since the fiber optical waveguides or coupler fibers of the star coupler have a diameter substantially equal to the thickness of the planar waveguide of the star coupler, losses then no longer occur in the transition between the fiber optical waveguide into the planar waveguide and only the packing density losses which amount to $\pi/4=0.79$ (1 db) for round fibers will occur in the transition from the planar waveguide into the out-going fiber optical waveguides. In addition to round fibers, the fibers whose cross-section is rectangular or square at least at the end which is connected to the mixing element can likewise be employed. In such a fiber, the length of one edge corresponds to the thickness of the mixing element. For such fibers, the packing density loss is zero.

Theoretically, losses no longer occur when coupling between the fiber optical waveguides of the star coupler and the system fibers. Given this dimensioning of the fiber optical waveguides, light is partially coupled from the core of the system fiber into the jacket of the fiber optical waveguide and is conducted therein. The amount of this light component will depend on the jacket thickness. Since the length of the fiber optical waveguides are slight, loss of this light component in the jacket is correspondingly small particularly when said fiber optical waveguides are embedded in an optical adhesive with a suitable low index of refraction.

In an advantageous development of the invention, the mixing element on the sides, which have no optical waveguides connected or abutted thereagainst, is embedded in a medium or material having an index of refraction which is smaller than the index of refraction of the material forming the mixing element. By so doing, the overall losses of the optical star coupler can be further reduced. Optical adhesives are a particularly suitable medium for this purpose. Other useful materials are air, and the utilization of a cover and substrate material. A further alternative consists in that the mixing element surfaces themselves are designed as jacketed surfaces with a smaller index of refraction. With materials with the same coefficient of thermal expansion or the like, then stresses, which possibly produce disruptions or faults, are avoided.

An advantageous method for producing the mixing element which is embedded in the optical adhesive is by milling a channel in the surface of a substrate, which channel has a thickness a little greater than the width of the mixer lamina and has a length shorter than the length of the mixer lamina and terminating in seating ridges; filling the channel with an optical adhesive; placing the mixing lamina on the seating ridges aligned and centered relative to the width of the channel; providing a cover having a corresponding cover channel; filling the cover channel with an optical adhesive and subsequently placing the cover on the substrate with a cover channel aligned with the channel of the substrate to have the mixer lamina completely surrounded on four sides by an optical adhesive material. Subsequent to hardening of the adhesive material, the method will include grinding away at least a portion of each of the seating ridges with the end of the mixer lamina to form the input and output ends for the mixing element.

In a modification of the method, the substrate has a surface milled to provide a central ridge extending across the surface of the substrate and having a width greater than the width of the mixing element, said milling including forming a first channel extending across the width of the ridge and having a length less than the length of the mixer lamina and said first channel being terminated by seating ridges having seating or support surfaces; bonding limiting members on the milled surface of the substrate adjacent said ridge to form an enlarged channel across the substrate, said limiting member having a height greater than the height of the ridge; filling the first channel with an optical adhesive; placing a mixer lamina having a thickness greater than the diameter of the optical fibers to be coupled to the mixing element on the ridge resting on the seating surfaces; filling the remaining portion of the enlarged channel with an adhesive; subsequent to hardening of the adhesive, grinding the exposed surface of the mixer lamina and the limiting members to the desired thickness and subsequently polishing the ground surfaces; providing a cover having a cover channel corresponding to the width of the ridge; securing said cover with the cover channel filled with an optical adhesive in alignment on said substrate and subsequently polishing the exposed ends of the mixer lamina to form the mixing element with polished ends. As mentioned hereinabove, preferably the mixer lamina, the initial substrate and the cover have approximately the same coefficient of thermal expansion. Also, the step of polishing the end faces of the mixer lamina to create or form the mixing element with polished ends include grinding the seating ridges and the ends of the lamina and then subsequently polishing the exposed ends. If desired, the step of grinding can completely remove the seating ridges at each end of the mixer element.

By these processes, the mixing element is disposed between a substrate and cover. If the substrate for the mixing element and the substrate for supporting the fiber optical waveguides to be connected to the element have the same thickness, an alignment between the fibers and the mixing elements is guaranteed in a simple manner when they are connected on a common plate. A height adjustment is thus unnecessary.

An adhesive such as LIR 394, which is sold by Polytec and has an index of refraction of 1.39, can be advantageously utilized with a mixing element which consists of a silicon glass with an index of refraction of approximately 1.45.

DESCRIPTION OF THE PREFERRED EMBODIMENTS

Figure 1:
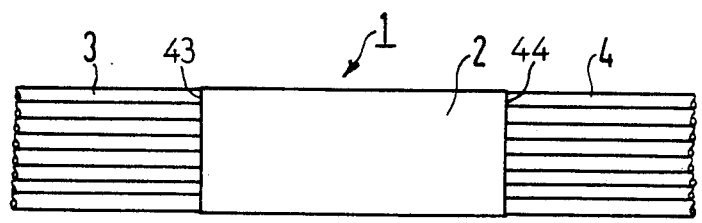
FIG. 1 is a plan view of an optical star coupler in accordance with the present invention.

The principles of the present invention are particularly useful in an optical star coupler generally indicated at 1 in FIG. 1. The star coupler 1 has a planar light waveguide 2, which is utilized as a mixing element which has ends 43 and 44. One of the ends 43 and 44 is an input end while the other end is an output. A group of light waveguides 3 abut one of the end faces 43 while a second group of light waveguides 4 abut the other end face 44. The diameter of each of the optical waveguides 3 and/or 4 correspond to the thickness of the planar waveguide 2. Each of the optical waveguides 3 and 4 are optical fibers and are coupled to a system fiber such as 9 (FIG. 2) as desired.

Figure 2:
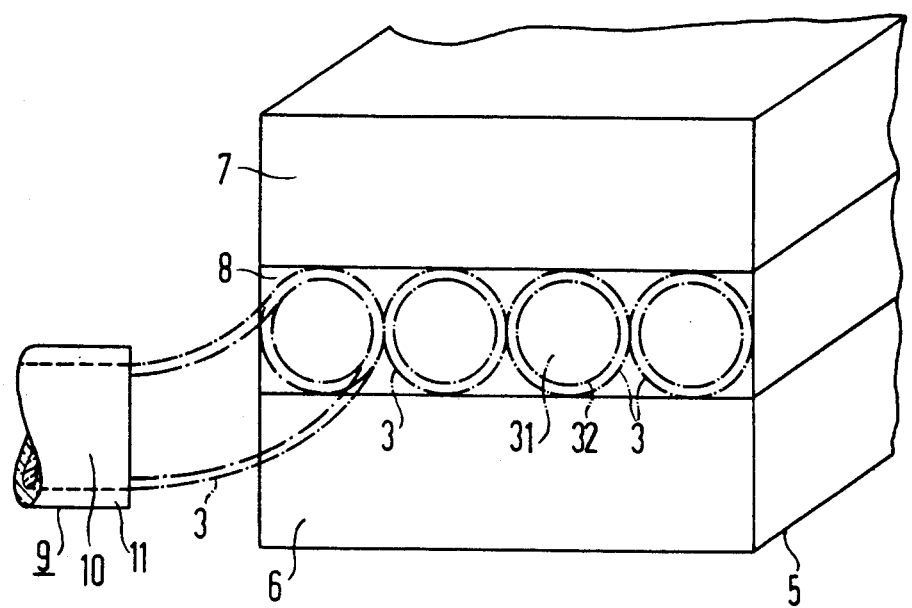
FIG. 2 is a perspective view of a mixing element in accordance with the present invention.

The mixing element 2 may have a structure of the mixing element 5 of FIG. 2. The mixing element 5 has a mixer lamina 8, which is sandwiched or embedded between a substrate 6 and a second member such as a cover 7. For purposes of illustration, the optical fibers forming the optical waveguides 3 are illustrated in broken lines with the end faces of each of the fibers being illustrated on an end face of the lamina 8. As illustrated, the core surface 31 is surrounded by a thin annular jacket or cladding surface area 32 for each of the fibers 3. Each of the fibers 3, as illustrated, is connected to a system fiber 9, which has a core 10 surrounded by a cladding 11. As derived from the illustration, the outer diameter of the fiber 3 including its jacket or cladding is substantially equal to the diameter of the core 10 of the system fiber 9.

Figure 3:
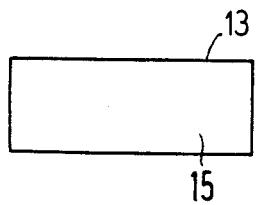
FIGS. 3-8 show various steps in manufacturing the mixing element embedded in the optical adhesive in accordance with the present invention with FIG. 3 being an end view of an initial substrate, FIG. 4 being an end view of the substrate after a first milling step, FIG. 5 being a cross-sectional view taken along lines V—V of FIG. 4, FIG. 6 being an end view of the substrate after limiting members and the mixing lamina have been attached thereto, FIG. 7 being an end view after grinding the limiting members and the mixing lamina to the desired thickness, and FIG. 8 being an end view of a completed mixing element.
Figure 4:
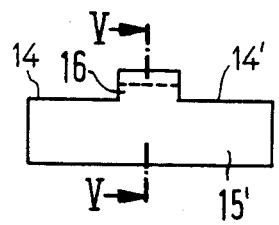
Figure 5:
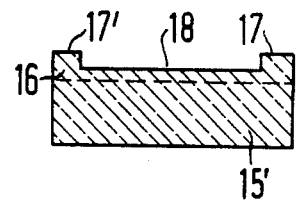
Figure 6:
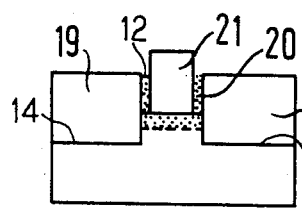

In order to produce a mixing element such as 2 which has its surfaces other than the end surfaces 43 and 44, engaged or embedded in an optical adhesive, a process utilizes an initial or starting substrate 15 which is illustrated in FIG. 3. The first step of the process is to mill a surface such as 13 of the substrate 15 to produce a milled substrate 15' which has a central ridge 16 (FIG. 4) extending above milled surface 14, 14'. The width of the central ridge 16 is selected to be approximately 1 millimeter greater than the width of the mixing element to be formed. The milling, as best illustrated in FIG. 5, also mills a portion of the ridge 16 to form a first channel 18 which extends across the entire width of the ridge 16. The length of the channel as illustrated in FIG. 5 is less than the total length of the substrate 15' and thus seating ridges 17 and 17' which have support surfaces are formed at each end of the channel. The length of the first channel 18 is also less than the desired length of the mixing element to be formed. As illustrated, each of the seating ridges 17 and 17' has a support surface, which is the remaining part of the surface 13 of the initial substrate 15.

In the next step of the process, two limiting lamina or members 19 and 19' are bonded to the milled substrate surface 14 and 14' adjacent to the central ridge 16. These limiting members 19 and 19' coact with the channel 18 to form an enlarged channel 12, which receives an optical adhesive, and the members limit the movement of the adhesive such as 20. After the adhesive is filled at least in the first channel 18, the mixer lamina 21, which has been polished on all surfaces except an upper surface is inserted in the channel 12 to rest on the support surfaces of the seating ridges 17 and 17'. With the optical adhesive then filled in, the lamina 21 is substantially surrounded on three sides by the adhesive. The width of each of the surfaces of the seating ridges 17 and 17' is always selected to be very small in comparison to the overall length of the mixing lamina 21 so that any losses due to the engagement with the surfaces of the ridges 17 and 17' can be neglected.

Figure 7:
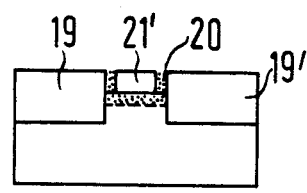

After the adhesive 20 has hardened, the exposed portion of the lamina 21 plus the upper surfaces of the limiting members 19 and 19' can be ground to the desired thickness to form a lamina 21' (FIG. 7). The upper surface of this lamina 21' and the surfaces of the ground surfaces of the members 19 and 19' are then polished to the desired degree. It is also possible that after setting and hardening of the adhesive 20 to grind the end faces of the lamina 21' and portions or all of the seating ridges 17 and 17' away. After the grinding, suitable polishing will occur.

Figure 8:
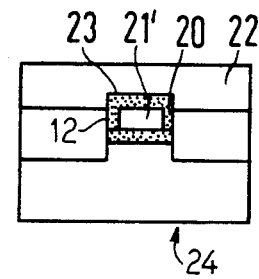

After grinding the lamina 21 to the desired thickness 21' as illustrated in FIG. 7, a cover 22, which contains a cover channel 23 of a width of substantially the same as the enlarged channel 12, is positioned and received on the polished and ground surfaces of the members 19 and 19' with the cover channel 23 aligned with the enlarged channel 12 to form a unit 24. This channel 23 prior to positioning is also filled with an adhesive so that all of the surfaces except the ends of the lamina 21' are surrounded by the optical adhesive. After the hardening of the adhesive of this last step, the end faces of the mixing lamina 21' and the unit 24 may be polished to the desired degree. Also, it is possible that the grinding of the end faces mentioned hereinabove with the grinding of the seating ridges can be delayed or done after the securing of the cover 22 to form the final unit 24 as illustrated in FIG. 8.

It should be noted that instead of a through mixing element having a mixer lamina 21', a reflex mixing element can also be produced by this method. In such a case, one end face of the mixing lamina 21' in the finished unit 24 is provided with a corresponding mirrored layer so that light conducted into the element from the opposite end is reflected at the end having the mirrored layer.

In a manufacturing variation, the lateral limiting member such as 19 and 19' can also be directly applied to the surface of the initial substrate. The advantage of grinding away a portion of the surface 13 of the initial substrate 15 to form the ground surfaces 14, 14' is that the surfaces 14, 14' means that the bonding location for the members 19 and 19' is situated below the supporting surfaces of the seating ridges 17 and 17'.

Figure 9:
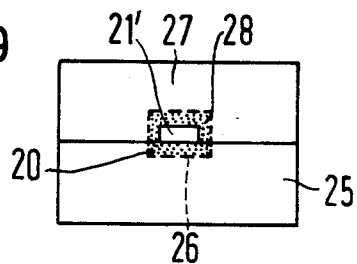
FIG. 9 is an end view of a mixing element manufactured by another method in accordance with the present invention.

A mixing element can also be manufactured in a simpler process when the mixing lamina is provided and has the desired thickness and has been polished and burnished on all surfaces except the end faces. In this modified method, a channel such as 26 is milled in the surface of a substrate 25 and has a width as illustrated which is somewhat wider than the mixing lamina 21' (FIG. 9) but has a length which is somewhat shorter than the length of the lamina 21'. The remaining portion of the surfaces of the substrate 25 will form the support surfaces of the seating ridges which position and support the mixing lamina 21' when it is secured over the groove 26.

Next, the groove 26 is filled with an optical adhesive and an optical adhesive is placed over the burnished or polished surfaces of the lamina 21'. A cover 27 having a groove or cover channel 28 is then positioned on the substrate 25 after the channel 28 has been filled with an optical adhesive so that the mixing element formed by the lamina 21' is surrounded by an optical adhesive except in those portions adjacent the ends which are engaged on the seating surfaces. After the hardening of the adhesive, the end faces can be ground and polished as desired. It is noted, that the entire seating ridge at each end can be removed during the grinding process if desired.

Each of the two above mentioned methods are suitable to be utilized in a process which simultaneously manufactures a plurality of mixing elements. In this case, a corresponding number of channels and ridges are provided in a basic plate with the desired number of limiting members. Thus, in one grinding and polishing step, an appropriate surface for a plurality of mixing elements could then be simultaneously processed.

Figure 10:
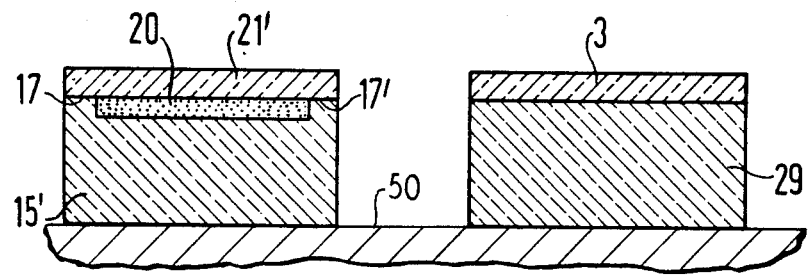
FIG. 10 is a cross-sectional view illustrating the alignment of a mixing element and a fiber optical waveguide in accordance with the present invention.

As illustrated in FIG. 10, mixing element 21' secured on a substrate 15' has its ends resting on the support surfaces of the seating ridges 17 and 17', but does not have a cover. Such an arrangement may be that illustrated in FIG. 7. The substrate 15' is then placed on a flat base 50 which also supports a substrate 29 having the same thickness as the base 15' and on which fiber optical waveguides 3 have been aligned. Thus, by moving the substrates 29 and 15' on the flat base 50, the two parts can be brought together with the mixing lamina 21', which forms the mixing elements, being in the same plane as the optical waveguides 3.

A further method provides that the mixing lamina 21' of the required thickness is bonded between the planar surfaces of the substrate and a cover such as illustrated in FIG. 2. When the adhesive layer has been made only a few μm thick, this method will provide a positional precision which may be sufficient for many uses of the element.

Although various minor modifications may be suggested by those versed in the art, it should be understood that I wish to embody within the scope of the patent granted hereon, all such modifications as reasonably and properly come within the scope of my contribution to the art.

I claim:

1. An optical star coupler for multi-mode light conducting fibers of a fiber optical system, said coupler including a mixing element and coupler fibers, said mixing element consisting of a planar waveguide having an input end and an output end, said ends being interconnected to two groups of said coupler fibers with a packing density of each group of coupler fibers at the input and output ends being as high as possible, said planar waveguide having a thickness being approximately equal to the diameter of each of the star coupler fibers, said coupler fibers being coupled to the input and output ends and being in the same plane with the mixing element, and each of the coupler fibers having a diameter approximately equal to a core diameter of the light conducting fibers of the fiber optical system so that substantially all of the light coupled from a fiber of the system into the coupler fiber is coupled into the mixing element and the losses of light being coupled from the mixing element through the coupler fiber to the fiber of the system are only due to losses from packing density.

2. An optical star coupler according to claim 1, wherein each of the coupler fibers has an end with a rectangular cross-section to form a rectangular end, said rectangular end being connected to one of the input and output ends of the mixing element, and said mixing element having a thickness corresponding to one side of the rectangular ends of the fibers.

3. An optical star coupler according to claim 1, wherein the mixing element on surfaces not connected to coupler fibers is in contact with a medium having an index of refraction less than the index of refraction of said mixing element.

4. An optical star coupler according to claim 3, wherein said medium comprises a material having substantially the same coefficient of thermal expansion as the material of the mixing element.

5. An optical star coupler according to claim 4, wherein the material of the medium is an optical adhesive.

6. An optical star coupler according to claim 3, wherein said medium is an optical adhesive.

7. An optical star coupler according to claim 1, wherein each coupler fiber has a core surrounded by a very thin cladding layer.

8. A method of manufacturing a mixing element utilized in a star coupler, said mixing element being a planar element having an input end and an output end for attachment to the ends of optical fibers lying in a plane and each of the fibers having a diameter substantially equal to the thickness of said element, said method comprising the steps of providing a beginning substrate and a mixer lamina; milling a channel in a surface of said substrate, said channel having a width a little greater than the width of the mixer lamina and having a length terminating in seating ridges shorter than the length of the mixer lamina; filling the channel with an optical adhesive; positioning the mixer lamina on the seating ridges in an aligned and centered position relative to the width of the channel; providing a cover having a corresponding cover channel; filling the cover channel of the cover with an optical adhesive; and subsequently placing the cover on the substrate with the cover channel aligned with the channel of the substrate to have the mixer lamina completely surrounded on four sides by an optical adhesive material.

9. In a method according to claim 8, which further includes the steps of grinding away at least a portion of each of the seating ridges with the mixer lamina aligned thereon to form the input and output ends for the mixer element.

10. A method of manufacturing a mixing element for use in a star coupler interconnecting a pair of bunches of optical fibers arranged in a plane having diameters substantially equal to the thickness of the mixing element, said method comprising the steps of providing a substrate; milling a surface of the substrate to provide a central ridge extending across the surface of the substrate and having a width greater than the width of the mixing element, said milling including forming a first channel extending across the width of the ridge and having a length less than the length of the mixing element and being terminated by seating ridges having seating surfaces; bonding limiting members on the milled surface of the substrate adjacent said ridge to form an enlarged channel across the substrate, said limiting members having a height greater than the height of the ridge; filling the first channel with an optical adhesive; placing a mixer lamina having a thickness greater than the diameter of the optical waveguides to be coupled to the mixing element on the ridge resting on the seating surface; filling the remaining portion of the enlarged channel with an adhesive; subsequent to hardening of the adhesive, grinding the exposed surfaces of the mixer lamina and the limiting members to the desired thickness and subsequently polishing the ground surface; providing a cover having a cover channel corresponding to the width of the ridge; securing said cover with said cover channel filled with optical adhesive in alignment on said substrate and subsequently polishing the exposed ends of the mixer lamina to form the mixing element.

11. A method according to claim 10, wherein the mixer lamina, the initial substrate, and the cover have approximately the same coefficient of thermal expansion.

12. A method according to claim 10, wherein the step of polishing the end faces of the mixer lamina includes grinding the seating ridges and the ends of the lamina and then subsequently polishing the exposed ends.

13. A method according to claim 12, wherein the step of grinding completely removes the seating ridge at each end of the mixing element.

* * * * *